Patented May 18, 1943

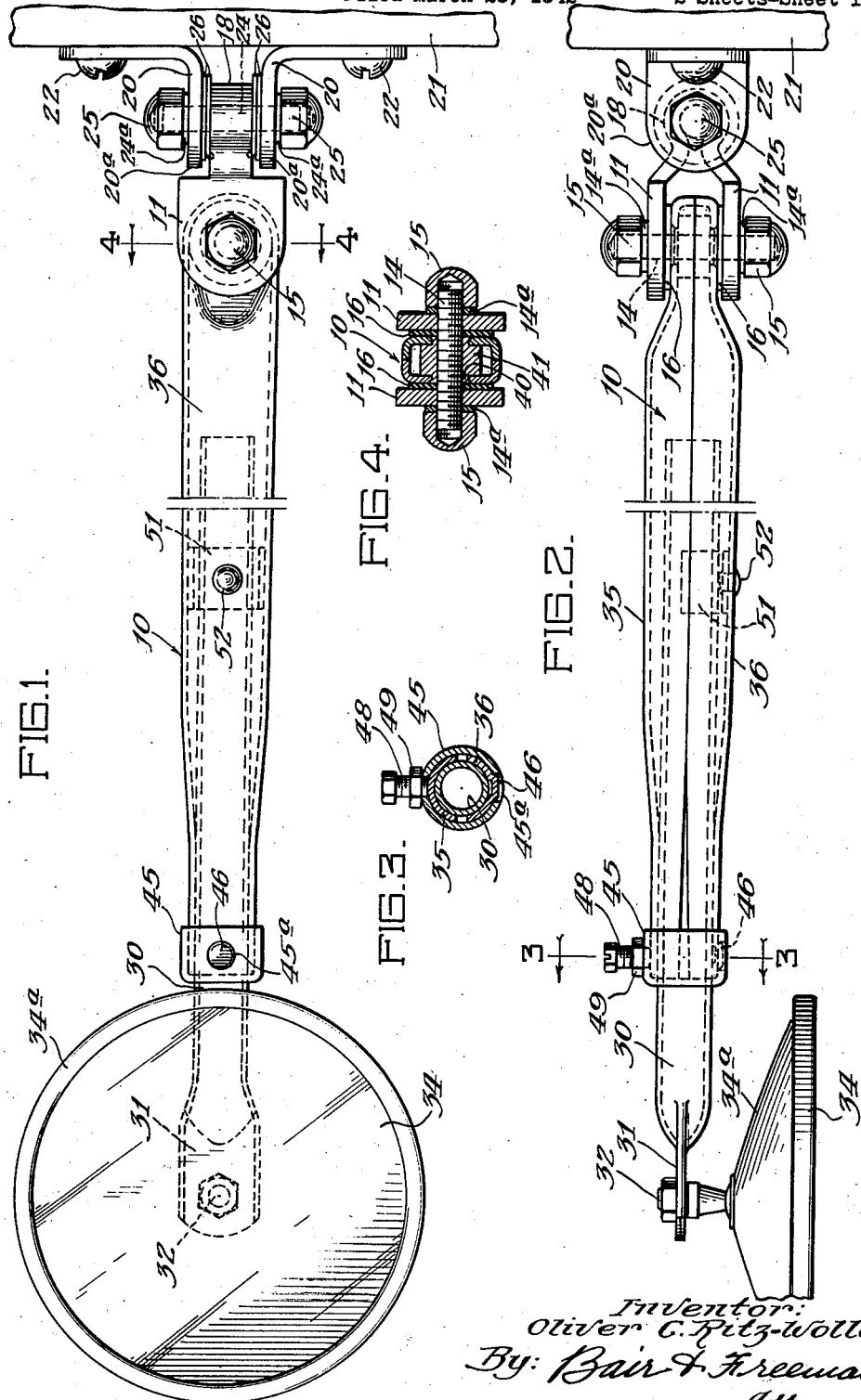

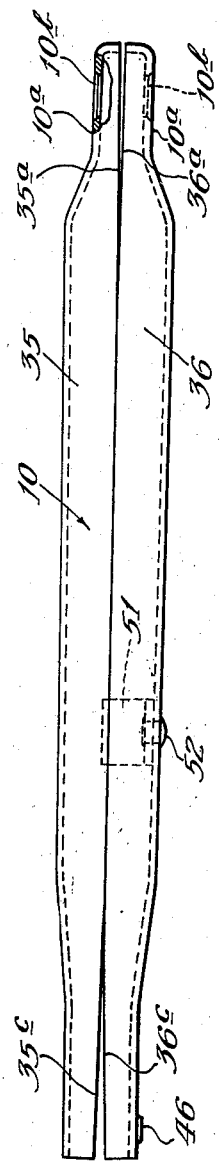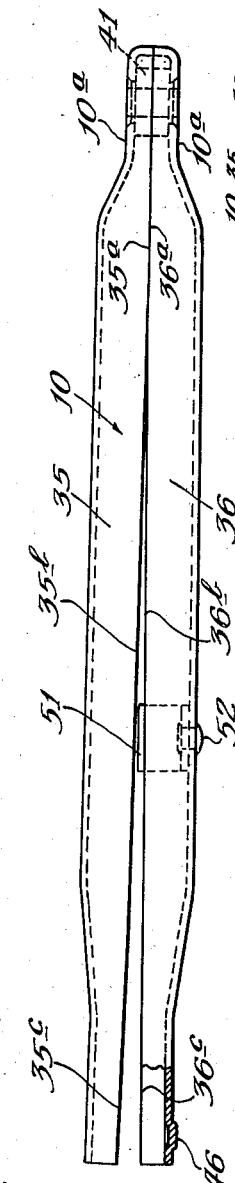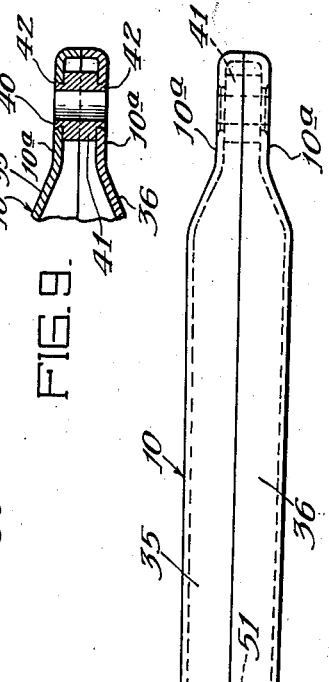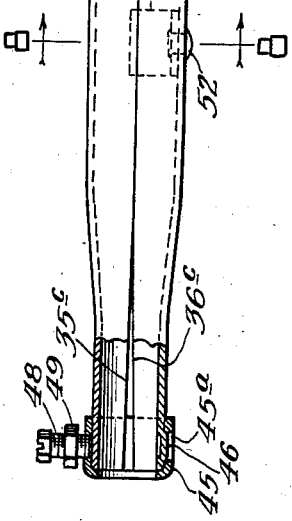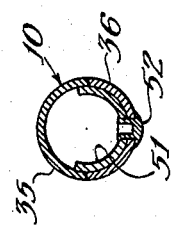

2,319,557

UNITED STATES PATENT OFFICE 2,319,557

SUPPORT ARM FOR MIRRORS

Oliver C. Ritz-Woller, Chicago, Ill.

Application March 23, 1942, Serial No. 435,775

4 Claims. (Cl. 248—278)

The present invention relates to supporting structures for rear vision mirrors of the type adapted for use on vehicles such as trucks, buses and the like. Such supporting structures are usually mounted in a position on the cab or other convenient part of the vehicle so as to enable the driver to see rearwardly alongside of the vehicle for guidance in safely maneuvering the vehicle.

Desirably, supporting structures of this general class include a supporting arm, one end of which is connected to a mounting for providing universal adjustment in order to dispose the mirror in a proper lateral and vertical plane for best obtaining clear rear vision of the roadway. Such arms preferably have been made in tubular form to obtain maximum strength and rigidity, while maintaining relatively light weight.

One of the objects of this invention is to provide a novel and improved support arm of the character indicated, composed of a plurality of connected elements which are constructed and arranged for convenience in handling, and in fabrication as well as affording convenience in the efficient application of a suitable protective coating to the entire surface of all or certain of said elements.

Another object is to provide an improved support arm of the character indicated which is composed of a plurality of elements which lend themselves for quick and easy assembly as a unitary device.

A further object of this invention is to provide an improved support arm of generally tubular form, made up of two semi-tubular elements adapted to be disposed in cooperating relation to form a hollow tubular body, and wherein one set of corresponding ends are fixedly connected together, and the cooperating edges of the elements are so arranged as to insure adequate resilient compressibility of the opposite end portions of the elements for frictionally embracing, in a telescopic manner, an extension arm associated with the mirror.

Still another object is to provide an improved support arm of the character indicated, which is of simple and sturdy construction and which is capable of economical manufacture.

Other objects and advantages of this invention will be apparent from the following description, taken in connection with the accompanying drawings in which:

Figure 1 is a view in side elevation of a rear view mirror and supporting structure, shown attached to a mounting, and embodying the present invention.

Figure 2 is a top plan view.

Figures 3 and 4 are transverse sectional views through the supporting arm, taken substantially as indicated at lines 3—3 and 4—4 on Figures 2 and 1, respectively.

Figure 5 is a plan view of the two cooperating semi-tubular elements comprising the supporting arm, shown in relation to each other prior to connecting together.

Figure 6 is a view similar to Figure 5, but showing the mounting end of the semi-tubular elements of the arm permanently connected together.

Figure 7 is a view in side elevation of the complete, assembled arm, with portions broken away to show the manner of connection of the free ends of the semi-tubular elements of the arm by means of a locking collar.

Figure 8 is a transverse sectional view through the arm, taken as indicated at line 8—8 of Figure 7.

Figure 9 is a fragmentary, vertical sectional view through the permanent connection of the two semi-tubular elements of the arm, as seen in Figure 6.

In the illustrated embodiment of my invention, as seen in the drawings, the tubular arm, indicated generally at 10, has one end flattened so as to provide a pair of closely spaced apart, substantially parallel flattened faces 10$^a$ for pivotally mounting said end of the arm between a pair of spaced apart lugs 11 of a universal mounting bracket. The flattened faces 10$^a$ are provided with aligned apertures 10$^b$, for registration with correspondingly aligned apertures formed in the lugs 11. The arm is pivotally connected between the lugs 11 by means of threaded stud 14, having nuts 15. Interposed between the flattened faces 10$^a$ and the inner surfaces of the lugs 11 are friction washers 16, and between the nuts 15 and the outer surfaces of lugs 11 are spring washers 14$^a$, so that when the stud 14 and nuts 15 are properly tightened, the support arm 10 and any associated elements may be frictionally retained in any desired vertical position of adjustment about the horizontal pivot axis formed by the connection of the arm to said lugs 11.

The lugs 11 are connected together by a substantially closed generally tubular body member 18, mounted between a pair of spaced apart, angle-shaped brackets 20, which brackets are rigidly secured to a mounting, as indicated at 21, by means of screws 22. The body member 18 is pivotally mounted between the outwardly projecting legs 20$^a$ of the brackets 20 by means of a threaded stud 24 and nuts 25, the former extending through aligned apertures formed in said legs 20$^a$ of the brackets. Suitable washers, indicated at 26, are interposed between the ends of the body member 18 and the inner faces of legs 20$^a$ of the brackets, and spring washers 24$^a$ are interposed between the outer surfaces of legs 20$^a$ and the underside of nuts 25, for frictionally retaining the supporting arm and its associated parts in any desired lateral position of adjustment about the vertical pivot axis formed by said connection to the legs 20ª. It will now be apparent that the total supporting structure for the arm 10 provides for universal adjustment of said arm and its associated parts within a permissible range of pivotal movement of the arm with respect to the lugs 11 and the body member 18 with respect to the legs 20ª of the mounting brackets 20.

Telescopically associated with the outer or free end of the arm 10 is a tubular auxiliary arm 30, having its outer end flattened, as indicated at 31, for connection to a stud 32 projecting centrally from the rear surface of the mounting frame 34ª of a mirror, indicated at 34. As will hereinafter be described, the auxiliary arm is secured in a desired position of adjustment with respect to the support arm 10, so that the mirror 34 may be disposed in any convenient position of adjustment so as to insure proper rear vision of the roadway, when the supporting structure is mounted on a vehicle.

The supporting arm 10, which in the main constitutes the essence of this invention, is of generally hollow tubular form, and is composed of two main elements 35 and 36, of substantially identical contour and size, and, as may be seen in the drawings, are of generally semi-tubular cross-section. These elements are formed as sheet metal stampings, to obtain maximum strength and convenience in assembly, and because of their being apertured at one end, as indicated at 10ᵇ, said elements may be conveniently handled by placing the apertured end over a hook or other fixture so as to permit conveniently coating the entire surface, interior and exterior, with some suitable material to prevent oxidation. By virtue of this construction, it is possible to conveniently subject the entire element to various types of treatment or plating or finishing. This has not been possible in connection with prior structures wherein the arm is composed of a single, one-piece tubular body.

In the construction illustrated in the drawings, the cooperating edges of the elements are of novel formation, and it will be noted that the cooperating edge portions, as indicated at 35ª and 36ª adjacent the pivotal end of the arm, are relatively flat, and are disposed in an outward, slightly acute angle to the normal plane of the cooperating intermediate edge portions, designated at 35ᵇ and 36ᵇ of said elements 35 and 36. The cooperating edge portions, as indicated at 35ᶜ and 36ᶜ, at the free end of the arm, are also disposed in an outwardly inclined acute angle with respect to the intermediate edge portions 35ᵇ and 36ᵇ, respectively.

While not essentially so, it is desirable that the pivotal end of the arm be relatively fixed, that is, the elements 35 and 36 be permanently connected together. In the construction illustrated in the drawings, I have shown a bushing 40 extending through the aligned apertures 10ᵇ in the flattened portions 10ª of the elements of the arm, and the bushing is provided with an enlarged central area, as indicated at 41, so as to constitute a spacer to maintain the adjacent ends of the elements of the arm in proper spaced apart relation to each other. The ends of the bushing 40 are flanged outwardly, as indicated at 42, so as to, in effect, provide a rivet connection between the adjacent ends of said elements of the arm and the bushing 40. If desired, a separate bushing may be employed, in the same manner as above described, and the spacing of the elements 35 and 36 may be obtained by merely placing on the bushing intermediate the elements 35 and 36 a suitable spacer member or washers may be used for this purpose if desired. It is to be understood, however, that the elements 35 and 36 need not be connected together at their pivot end, other than mounting on the bolt 14, between the lugs 11, but for convenience in handling and assembly, it is preferred that said elements be permanently connected so that the arm 10 may be handled as a unitary element.

When the pivotal ends of the elements are firmly secured together, as above described, the cooperating edges 35ª and 36ª are brought into line contact, as seen in Figure 6. In such relation the cooperating edges 35ᵇ and 36ᵇ of the intermediate edge portions of the elements tend to separate and form a V-shaped slot. The free ends of the elements may then be connected together so as to dispose the cooperating intermediate edge portions 35ᵇ and 36ᵇ into line contact, as seen in Figure 7 of the drawings, by means of a locking collar, as indicated at 45, which is fitted over the free ends of the elements 35, 36, in abutting relation to the extreme end portion of the respective elements, as seen in the drawing. It is to be understood that the locking collar is of a size so as to make it necessary in order to be placed in locking position to yieldingly compress the free end portions of the elements and force the cooperating intermediate edge portions 35ᵇ and 36ᵇ into line contact with each other. In such position of the parts, the cooperating edges 35ᶜ and 36ᶜ are disposed in spaced apart relation so as to insure, at all times, an additional range of movement of the extreme end portions of the elements toward each other for firmly gripping therebetween the auxiliary extension arm 30 associated with the mirror.

To insure retaining the locking collar in position on the arm elements 35, 36, one of said elements, at its free end, and, as herein shown, the element 36, is formed with an outward projection or embossment 46, which is adapted to register and seat in an opening 45ª formed in the wall of the locking collar, as seen in Figure 7 of the drawings. It will therefore be apparent that when the extreme end portions of the elements 35 and 36 are sufficiently compressed together, the collar 45 may be slipped thereover so as to cause the projection 46 to be seated in locking engagement in the aperture 45ª. Threaded in the diametrically opposite wall portion of the collar is a set screw 48, the end of which is adapted to engage the external surface of the end portion of the element 35 so that upon threading of the set screw inwardly, the extreme end portion of the element 35 is compressed toward the corresponding end portion of the element 36 so as to increase the frictional engagement of the inner surface of the elements 35 and 36 with respect to the auxiliary arm 30 associated with the mirror. When the set screw has been adjusted to proper position it may be permanently secured in such position by means of a lock nut 49.

To insure against lateral strains on the arm, which may have a tendency to separate the elements 35 and 36 in the plane of their abutment connection, I have provided a bracket 51 of generally semi-cylindrical form, as seen in Figure 8 of the drawings. This bracket is rigidly secured by means of a rivet 52 to the inner surface of one of the elements, and herein shown as the element 36, and the terminal ends of the bracket member 51 project above the plane of the cooperating abutting edges of the elements, so that when the elements 35 and 36 are assembled together, as seen in Figure 7 of the drawings, the terminal ends of the member 51 tend to center the elements with respect to each other, and tend to oppose any lateral strains imparted to the arm in the general direction of the plane of the abutment connection of the elements.

It will be apparent that the arm 10 is of sturdy practical construction, and may be produced as a unitary element, so as to permit convenience in replacement in the "field," if necessary.

Although I have herein shown and described a certain preferred embodiment of my invention, manifestly it is capable of modification and rearrangement of parts without departing from the spirit and scope thereof. I do not, therefore, wish to be understood as limiting this invention to the precise form herein disclosed, except as I may be so limited by the appended claims.

I claim as my invention:

1. A support of the character described, comprising a bracket for securement to a mounting, and an arm having one end mounted on said bracket for friction retaining pivotal movement, means connected to the other end of said arm for supporting a mirror or the like, said arm being formed of two sheet metal stamped elements of generally semi-tubular cross section, adapted to be disposed in cooperating relation to substantially form a hollow tubular body, means including a tubular sleeve extending through aligned apertures in said elements for securing said elements together at said first mentioned end of the arm and providing an aperture for said pivotal mounting of said arm between said lugs, and a spacing member intermediate the ends of said sleeve and engaging the inner surfaces of said elements, for spacing said elements apart, and means connected to said other end of said elements for securing them together.

2. A support of the character described, comprising a bracket for securement to a mounting, and an arm having one end mounted on said bracket for friction retaining pivotal movement, means connected to the other end of said arm for supporting a mirror or the like, said arm being formed of two outwardly bowed sheet metal stamped elements of generally semi-tubular cross section, adapted to be disposed in cooperating relation to substantially form a hollow tubular body, said elements being rigidly connected together at said one end, the adjacent edges of said elements, at said other end thereof, being spaced apart on account of the bowing to provide yielding resistance to pressure of the end portions of said elements toward each other, and a locking collar mounted on the outer portions of said other end of said elements, to retain the free ends of said elements yieldingly constrained in an assembled relation, one of said elements and said collar having interengaging means for releasably locking the collar in such position on said elements.

3. A support of the character described, comprising a bracket for securement to a mounting, and an arm having one end mounted on said bracket for friction retaining pivotal movement, means connected to the other end of said arm for supporting a mirror or the like, said arm being formed of two sheet metal stamped elements of generally semi-tubular cross section, adapted to be disposed in cooperating relation to substantially form a hollow tubular body, means connected to said other end of said elements for securing them together, and means mounted in said arm, intermediate its ends, for aligning said elements and absorbing lateral strains tending to separate said elements in the direction of the plane of abutment of said elements, said means comprising a U-shaped member rigidly connected to the interior of one of said arm elements and having the legs thereof extending beyond the plane of jointure of the arm elements.

4. A support of the character described, comprising a bracket adapted to be secured to a mounting, and an arm having one end mounted on said bracket for friction retaining pivotal movement, means connected to the other end of said arm for supporting a mirror or the like, said arm being formed of two sheet metal stamped elements of generally semi-tubular cross section, secured in abutting relation at said one end, and adapted to be disposed with their edges in cooperating relation to substantially form a hollow tubular body, the cooperating edges of one of said elements, adjacent said pivot end, being relatively flat and disposed in a plane at a relatively slight acute angle to the remaining cooperating edge portions of said one element, and means connected to said other end of said elements for drawing said other ends of said elements together in such cooperating relation with the cooperating edges of both elements adjacent said pivot end disposed in abutting relation.

OLIVER C. RITZ-WOLLER.